March 1, 1927.
J. R. GAMMETER
1,619,067
DOORCHECK STRAP
Filed March 5. 1924
FIG-1-
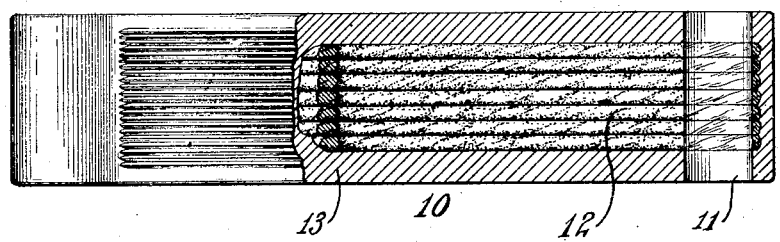
FIG-2-
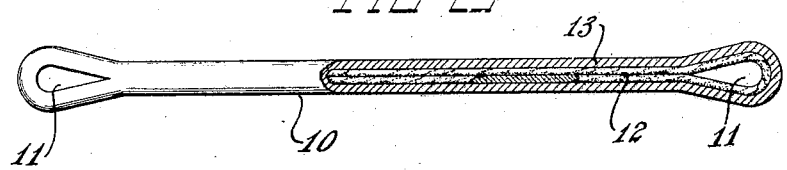
FIG-3-
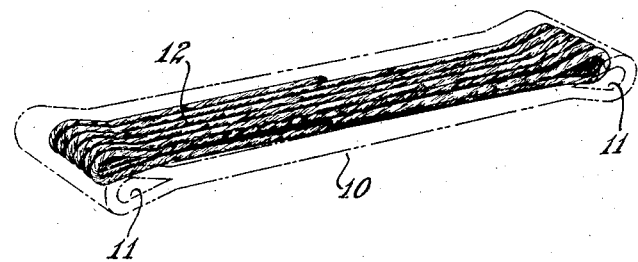
Inventor
John R Gammeter
By Robert M. Pierson
Atty Patented Mar. 1, 1927.

1,619,067

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

DOORCHECK STRAP.

Application filed March 5, 1924. Serial No. 697,019.

This invention relates to door check straps, such, for example, as are used on automobile doors to limit the opening movement thereof, and more particularly to straps of the substantially inextensible type, which heretofore have comprised a rubber structure reinforced with fabric laminations.

My chief object is to provide a strap of suitable tensile strength, flexibility and neat appearance which may be made more cheaply than those of existing types.

Of the accompanying drawings:

Fig. 1 is a plan view, partly broken away and in section, of a strap embodying my invention in its preferred form.

Fig. 2 is a side elevation of the same, partly broken away and in section.

Fig. 3 is a phantom perspective view of the strap, the reinforcement being shown in full lines and a rubber cover thereon in broken lines.

Referring to the drawings, 10 represents generally a door check strap of standard shape, and 11, 11 are apertures in its respective end portions adapted to receive the cross-bars of a pair of anchor brackets (not shown), by means of which it is attached to a door and door-frame.

The strap 10 comprises a substantially inextensible reinforcement of rubberized cord 12, imbedded within a flexible covering 13 of vulcanized rubber, said reinforcement comprising a continuous cord disposed in a plurality of laterally abutting loops, the reaches of cord in each loop being flattened and pressed together throughout the major portion of the strap intermediate of its ends, to form two joined plies of cord throughout such portion, and separated to provide the apertures 11 at the ends of the strap. The respective end portions of the reinforcing cord 12 preferably terminate near the middle of the strap and over-reach each other, to provide the maximum strength of the strap for a given quantity of cord.

In the preferred practice in the manufacture of my improved strap, the cord in continuous form is run through a bath of rubber cement and then wound upon a pair of spaced-apart spindles or mandrels adapted to form the apertures 11. The wound unit is then pressed in its middle portion, to stick the parallel reaches of cord against each other, and is then covered with rubber in any suitable manner and vulcanized in a mold, with the mandrels therein.

My improved strap has advantages over the fabric-reinforced strap in that it eliminates the weaving of the material, the cord may be economically coated with rubber prior to the winding, and the cross-threads, which do not contribute appreciably to the strength of the strap in use are eliminated, with a substantial saving of material for a strap of given strength. As the strap in use is subjected only to lengthwise strains, all of the cords in my strap are so disposed as to take the strain, which permits the strap to be made light and sufficiently flexible without sacrifice of strength. As the strap may be made relatively narrow, a saving of rubber in the cover may be had.

My invention is susceptible of modification within its scope, and I do not wholly limit my claim to the specific construction shown.

I claim:

A door check strap comprising a rubber structure having imbedded therein a single strand of material disposed in a plurality of adjacent longitudinally disposed, laterally abutting loops, said loops being open at the ends of the strap to provide apertures in the strap and having their intermediate portions all secured closely together throughout the rest of the strap.

In witness whereof I have hereunto set my hand this 29th day of February, 1924.

JOHN R. GAMMETER.